United States Patent [19]

Morita

[11] Patent Number: 5,094,602
[45] Date of Patent: Mar. 10, 1992

[54] INJECTION MOLD FOR A MAGNETIC TAPE CASSETTE

[75] Inventor: Kiyoo Morita, Kanagawa, Japan

[73] Assignee: Fuji Photo Film Co., Ltd., Kanagawa, Japan

[21] Appl. No.: 589,575

[22] Filed: Sep. 28, 1990

[51] Int. Cl.$^5$ ............................................. B29C 45/22
[52] U.S. Cl. ............................... 425/130; 264/328.7; 264/328.8; 425/573; 425/577
[58] Field of Search ............... 425/127, 130, 573, 577, 425/812; 264/2.2, 328.7, 328.8

[56] References Cited

U.S. PATENT DOCUMENTS

| | | | |
|---|---|---|---|
| 4,726,758 | 2/1988 | Sekine et al. | 425/577 |
| 4,840,760 | 6/1989 | Oishi | 264/328.7 |

Primary Examiner—Timothy Heitbrink
Attorney, Agent, or Firm—Sughrue, Mion, Zinn, Macpeak & Seas

[57] ABSTRACT

An injection mold for forming the halves of a magnetic tape cassette includes stationary and movable molds defining a cavity, and confronting slidable cores disposed in holes extending through the molds. An opaque primary resin is injected into the cavity to form an outer portion of a cassette half with the core faces abutting each other, whereafter the cores are retracted to define a central window cavity in which a transparent secondary resin is injected. A lip surrounds the inner edge of the hole through which one of the cores extends to laterally support and guide the core, and to avoid any jamming or inaccuracy in the retracted position of the core due to thermal expansion.

7 Claims, 3 Drawing Sheets

INJECTION MOLD FOR A MAGNETIC TAPE CASSETTE

BACKGROUND OF THE INVENTION

This invention relates to an injection mold for manufacturing a two-color molding of synthetic resin.

In general, a magnetic tape cassette used for audio or video devices comprises a case body made up of upper and lower cassette halves, a pair of hubs rotatably supported in the case body and a magnetic tape wound on the hubs.

The upper and lower cassette halves are formed by injection molding plastic material or the like. More specifically, in order to form the upper or lower halves, molten material is injected through a direct gate and a submarine gate into the cavity which is formed between two metal molds in correspondence to the configuration of the cassette half. The molding of the cassette half is accomplished when the material thus injected has been cooled and hardened. The cassette half thus formed is taken out of the molds. Thereafter, printed design sheets are bonded to the outer surfaces of the cassette halves or designs are printed directly on them.

In order to allow the user to observe the magnetic tape in the cassette from outside, the upper and lower halves are made of transparent material, or as shown in FIG. 4, a transparent or translucent window 6 is formed in the cassette half body 2a which is opaque. The window 6 may be modified in various ways to improve the design of the case body 1.

Heretofore, to provide the window 6, a window member is formed separately from the cassette half body 2a, and then joined to the latter with adhesive or by ultrasonic welding. In this case, the design is limited because it is necessary to form the window member and to bond it to the cassette half body. In addition, the method is low in productivity. Hence, recently, a method of manufacturing a magnetic tape cassette by two-color molding using a core back system has been employed.

A method of manufacturing the cassette halves according to the core back system will be described with reference to FIGS. 5 and 6, which are sectional views of a cassette half mold which corresponds to the section A—A of the audio compact cassette shown in FIG. 4. The metal injection mold according to the core back system, as shown in FIG. 5, includes a stationary mold 20, a movable mold 22, a slide core 26 fitted in a slide hole 24 formed in the stationary mold 20, a slide core 30 fitted in a slide hole 28 formed in the movable mold 22, and a stationary block 25 provided in the slide core 26. A mold cavity 32 for forming the above-described cassette halves 3a and 3b is defined by the facing inner surface of the stationary mold 20 and the movable mold 22. The slide cores 26 and 30 protrude into the cavity 32 in such a manner that they abut against each other, to form the above-described window 6.

The cavity 32 communicates with a submarine gate 33 which is formed in the movable mold 22 in order to inject primary resin, and with a direct gate 34 which is formed in the stationary mold 20 near the slide core 26 in order to inject secondary resin (in the case of FIGS. 5 and 6, the direct gate 34 is provided in the stationary block 25).

To mold the cassette half body 2a, first the stationary mold 20 and the movable mold 22 are brought together. Thereafter, the slide cores are inserted into the cavity with hydraulic drive means until they abut against each other substantially at the middle of the thickness of the cavity 32. Under these conditions the opaque primary resin is injected into the cavity through the submarine gate 33. Then, as shown in FIG. 6, the slide cores 26 and 30 are retracted to form a window cavity 36. Finally, the transparent secondary resin is injected into the window cavity 36 through the direct gate 34 provided in the stationary block 25 to form the window 6.

The cassette half body 2a and the window 6 are welded together by the heat and pressure provided during the injection molding. The slide cores 26 and 30 are different in dimensions, and therefore a step is formed in the window 6, thus making the welded portion of the window 6 and the cassette half body 2a strong enough to withstand the force applied in the direction of thickness.

As described above, since the direct gate 34 is provided near the slide core 16, the slide core 26 is liable to be thermally expanded by the heat of the injected molten resin. Further, the outer wall of the end portion of the slide core 26 protruding from the slide hole 24 is not laterally supported by anything when positioned as shown in FIG. 5. Therefore, the expansion of the slide core 26 may impede its accurate sliding retraction to form the window cavity. To minimize this problem it is necessary to manufacture the stationary mold 20 and the slide core 26 with a high degree of accuracy, which is costly.

Further, the molten resin injected under pressure into the window cavity 36 may creep between the already-formed opaque portion of the cassette half body 2a and the stationary mold 20, thus deforming the cassette half body and/or impairing its external appearance.

SUMMARY OF THE INVENTION

Accordingly, an object of this invention is to eliminate the above-described difficulties accompanying the conventional injection mold by providing an injection mold in which the slide core provided near the direct gate may be moved accurately, whereby the external appearance of the resultant molding is not impaired.

The foregoing object has been achieved by the provision of a metal injection mold of the type described above in which at least one of the mold parts which has a slide hole near an injection gate has a continuous lateral support lip or protrusion surrounding the opening of the slide hole into the mold cavity at the position to which the slide core is inwardly extended during the initial molding step.

DESCRIPTION OF THE PREFERRED EMBODIMENT

Figure 1:
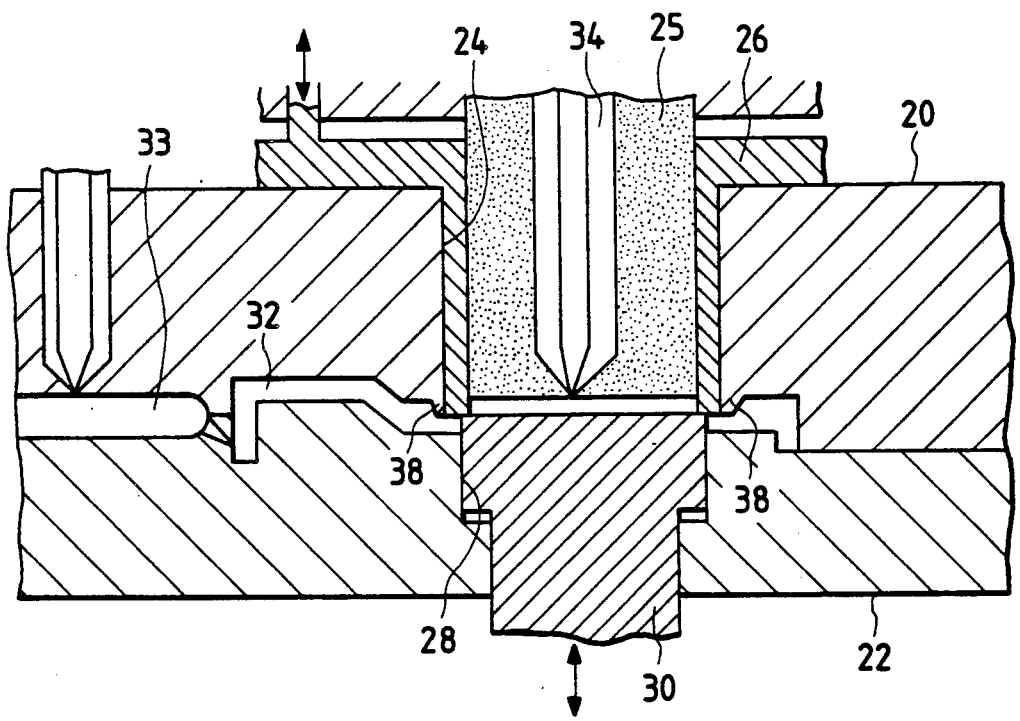
FIGS. 1 and 2 are sectional views of a metal mold for forming the halves of a magnetic tape cassette according to one embodiment of this invention.
Figure 2:
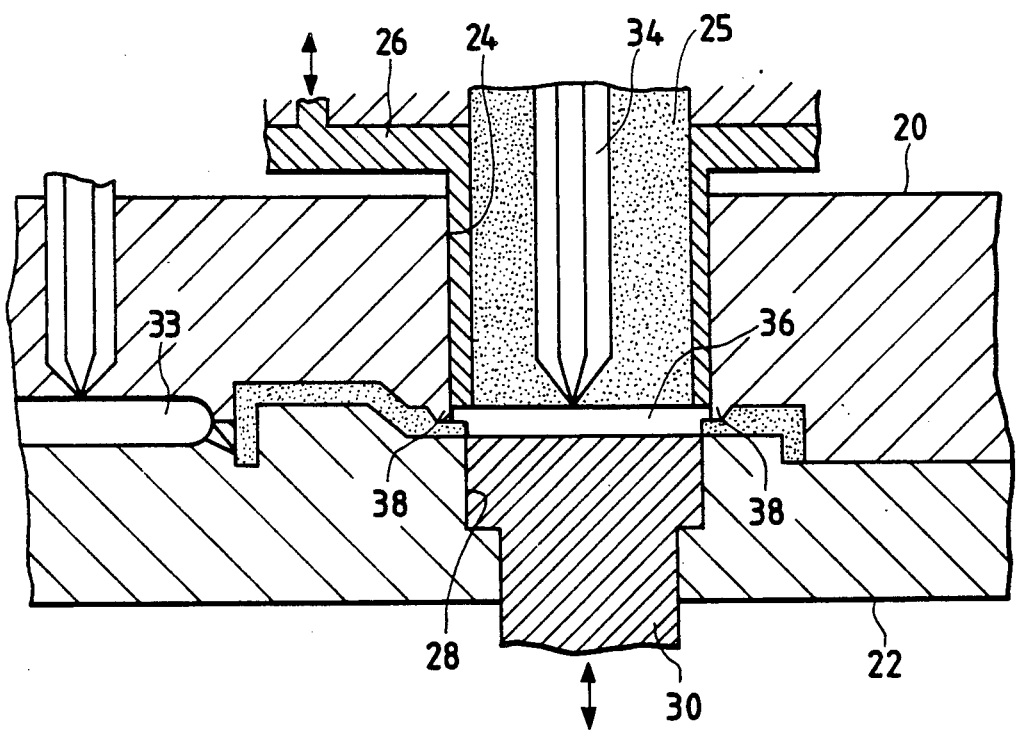
Figure 4:
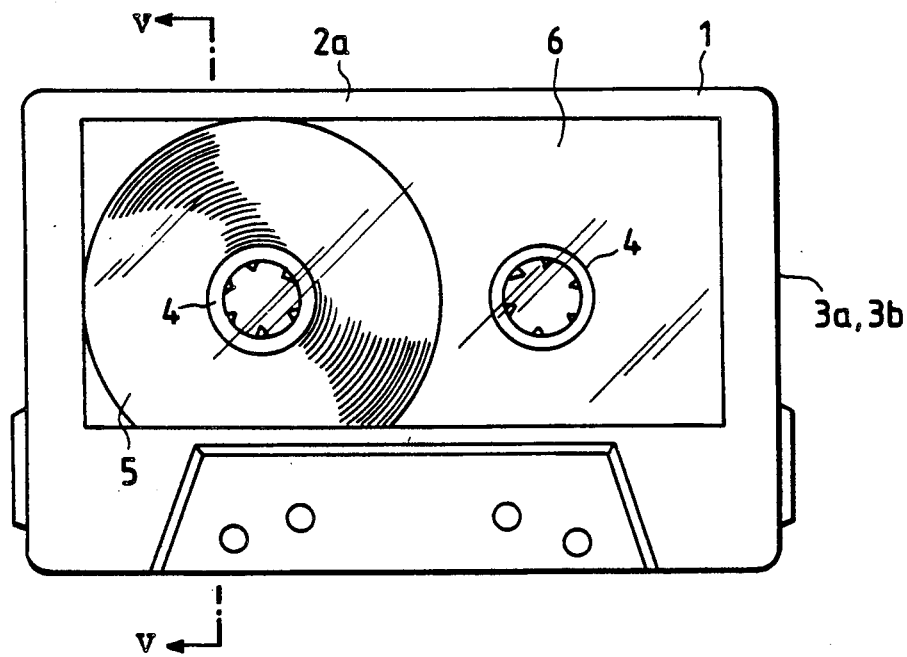
FIG. 4 is a plan view showing a conventional magnetic tape cassette.
Figure 5:
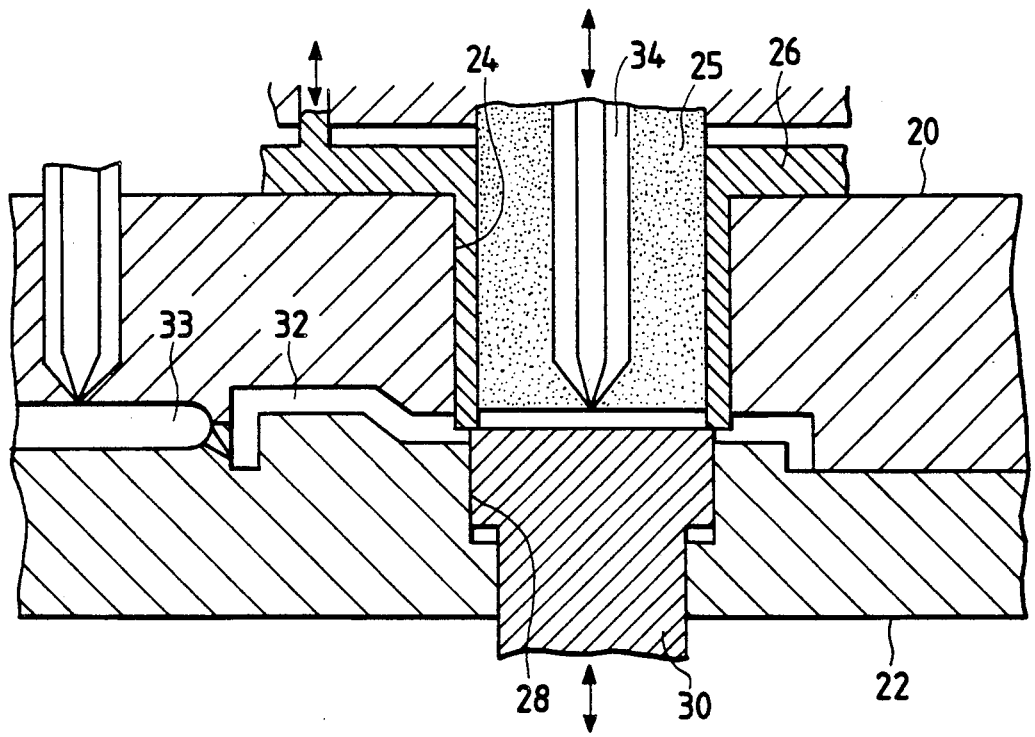
FIGS. 5 and 6 are sectional views of a conventional metal mold for forming the halves of a magnetic tape cassette.
Figure 6:
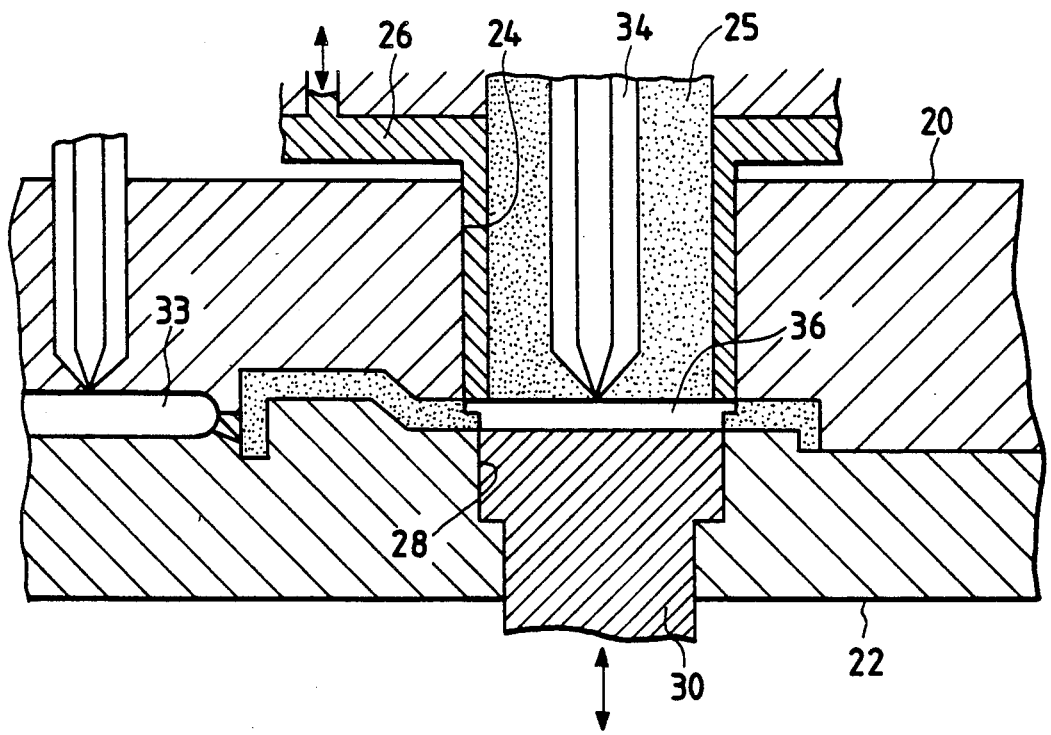

Referring to the accompanying drawings, FIGS. 1 and 2 show a metal injection mold for forming the halves of a magnetic tape which is substantially similar to that shown in FIG. 4. The cassette is extensively employed in audio devices, and includes a case body 1 composed of upper and lower cassette halves 3a and 3b, a pair of hubs 4 rotatably supported in the case body, and a magnetic tape 5 wound on the hubs. Similarly as in the case of the conventional magnetic tape cassette, the case body 1 is made of plastic resin, and a window 6 and a cassette half body 2a are formed by a core back type two-color molding method.

The injection mold, as shown in FIG. 1, includes a stationary mold 20, a movable mold 22, a slide core 26 provided in a slide hole 24 formed in the stationary mold 20, a slide core 30 provided in a slide hole 28 formed in the movable mold 22, and a stationary block 25 provided in the slide core 26. A mold cavity 32 for forming the upper and lower cassette halves 3a and 3b is defined by the facing inner surfaces of the stationary mold 20 and the movable mold 22. The slide cores 26 and 30 for forming the window 6 protrude into the metal cavity 32 in such a manner that they are abutted against each other.

The cavity 32 communicates with a submarine gate 33 for the injection of an opaque primary resin, and with a direct gate 34, for the injection of a transparent secondary resin, which is provided near the slide core 26 of the stationary mold 20.

The inner end of the slide hole 24 formed in the stationary mold 20 to receive the slide core 26, where the slide core 26 abuts against the slide core 30 in the movable mold 22, is surrounded by a lateral support lip or protrusion 38. Therefore, whenever the slide core 26 is moved to the position where it abuts against the slide core 30, or it is retracted therefrom, it is always accurately guided and supported by the hole 24.

The protrusion 38 extends in the direction of the thickness of the mold cavity 32, and has a flat end face. The outer wall of the protrusion is tapered towards the mold cavity 32 is define a trapezoidal section.

To form the cassette half body 2a, the slide cores 26 and 30 are abutted against each other in the mold cavity 32 defined by the stationary mold 20 and the movable mold 22, whereafter the opaque primary resin is injected into the mold cavity through the submarine gate 33, so that it is molded into the cassette half body 2a whose configuration is defined by the stationary mold 20, the movable mold 22, and the slide cores 26 and 30.

After the primary resin has substantially solidified, the slides 26 and 30 are retracted to form a window cavity 36, as shown in FIG. 2. The retraction of the slide cores determines the thickness of the window 6; that is, the slide cores 26 and 30 are retracted along the slide holes 24 and 28, respectively, so that the window 6 is substantially equal in thickness to that of the cassette half body 2a. In this case, it should be noted that the slide core 26 is retracted until its end face becomes flush with the end face of the stationary block 25 which is so positioned as to determine the thickness of the window 6.

When the slide core 26 in the stationary mold 20 is abutted against the slide core 30 in the movable mold 22, the core 26 is surrounded by the protrusion 38. Therefore, even if the slide core 26 is thermally expanded by the heat from the direct gate or by the heat of the molten secondary resin, the slide core can still be axially moved. Hence, even if the stationary mold 20 and the slide core 26 are not so high in manufacturing accuracy, the injection mold provides a molding operation high in reliability.

Thereafter, secondary resin which is transparent is injected into the window cavity 36 defined by the primary resin molding, the slide cores 26 and 30 and the protrusion 38, to form the window 6. In this operation, the protrusion 38 prevents the injected secondary resin from flowing between the primary resin molding and the stationary mold 20.

The cassette half body 2a formed by the injection of the primary resin and the window 6 formed by the injection of the secondary resin are welded into a cassette half molding by the heat and pressure provided during the second resin injection. After the resins injected into the cavities have been cooled and hardened, the movable mold 22 is separated from the stationary mold 20 to remove the cassette half molding from the metal mold.

In each of the cassette halves 3a and 3b, a groove is formed in correspondence to the protrusion 38 of the stationary mold 20; that is, the outer surface of the cassette half body 2a is separated from that of the window 6. Hence, even if the surfaces of the cassette half body 2a and the window are made not flush with each other, for instance due to molding error, the defect will not impair the external appearance of the cassette half because it is difficult to visually detect the slight difference.

In the case where the direct gate 34 is provided near the slide core 30 instead of the slide core 26, the protrusion 38 is formed on the movable mold 22 so that the slide hole 28 of the movable mold 22 is extended to the position in the mold cavity to which the slide core 30 is moved. In the case where no direct injection gate is provided near the slide core, the protrusion may still be formed on the mold to insure the free and unimpeded movement of the slide core.

Figure 3A:
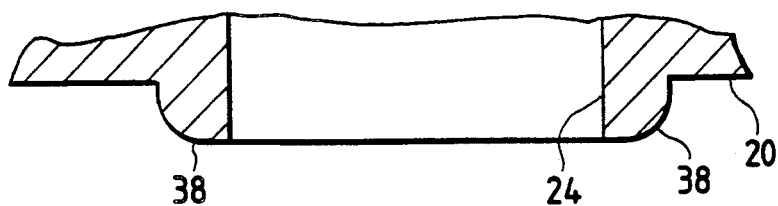
FIGS. 3(a), 3(b) and 3(c) are sectional views showing modifications of the support protrusion shown in FIGS. 1 and 2.
Figure 3B:
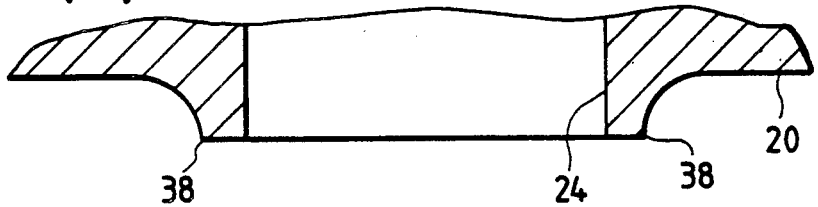
Figure 3C:
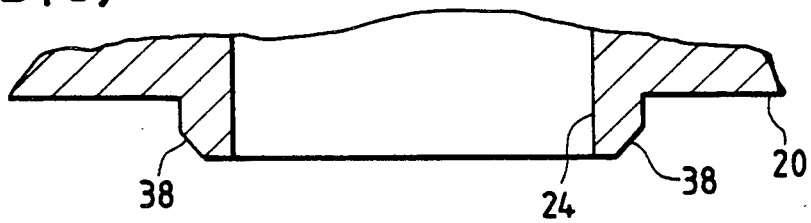

The configuration of the protrusion 38 is not limited that shown in FIGS. 1 and 2; that is, it may be modified as shown in FIGS. 3(a) through 3(c). In the case of FIG. 3(a), the outer wall of the protrusion is curved outwardly, while in the case of FIG. 3(b), the outer wall of the protrusion is curved inwardly. In the case of FIG. 3(c), the outer wall parallel with the inner or sliding wall has an obliquely inclined or chamfered edge. In all of these arrangements the end face of the protrusion is planar or substantially planar, which protects the protrusion from damage and improves the durability of the metal mold. Furthermore, whether the outer wall of the protrusion is curved inwardly, or outwardly, or has a chamfered edge, the cassette half body 2a and the outer wall of the protrusion are not brought into sliding contact with each other when the cassette half is released from the mold.

While the invention has been described with reference to a metal mold for forming the halves of a magnetic tape cassette, it should be noted that the invention is not limited thereto. That is, the technical concept of the invention is applicable to a variety of injection molds in which molding materials are injected into mold cavities to form a two-color molding.

What is claimed is:

1. An injection mold, comprising:

a) a pair of mold halves cooperable to define a primary cavity therebetween,
b) a pair of confronting holes defined in respective ones of the mold halves,
c) a pair of confronting cores slidably disposed in respective ones of the holes and displaceable between a first position whereat they extend into the primary cavity and abut each other to isolate a central zone of said cavity, and a second position whereat they are retracted from the primary cavity to define a secondary cavity in said central zone,
d) first gate means for injecting a first molding material into said primary cavity;
e) second gate means proximate one of the cores for injecting a second molding material into the secondary cavity, and
f) a continuous lip defined by one of the mold halves, surrounding an inner edge of a hole in which said one of the cores is disposed, and extending into the primary cavity to laterally support and guide an inner portion of said one of the cores, and to attendantly avoid any jamming of or inaccuracy in the retracted position of said one of the cores due to thermal expansion.

2. An injection mold according to claim 1, configured to form halves of a magnetic tape cassette, further comprising a submarine gate for injecting an opaque resin material into the primary cavity when the cores are in said first position, and wherein said gate means is adapted to inject a transparent resin material into the secondary cavity when the cores are in said second position, said transparent resin material forming a window in the secondary cavity.

3. An injection mold according to claim 2, wherein an innermost edge of said lip is substantially flat.

4. An injection mold according to claim 3, wherein an outer side edge of said lip is continuously bevelled.

5. An injection mold according to claim 3, wherein an outer side edge of said lip is convexly curved.

6. An injection mold according to claim 3, wherein an outer side edge of said lip is concavely curved.

7. An injection mold according to claim 3, wherein an outer side edge of said lip is chamfered.

* * * * *